Patented Apr. 24, 1928.

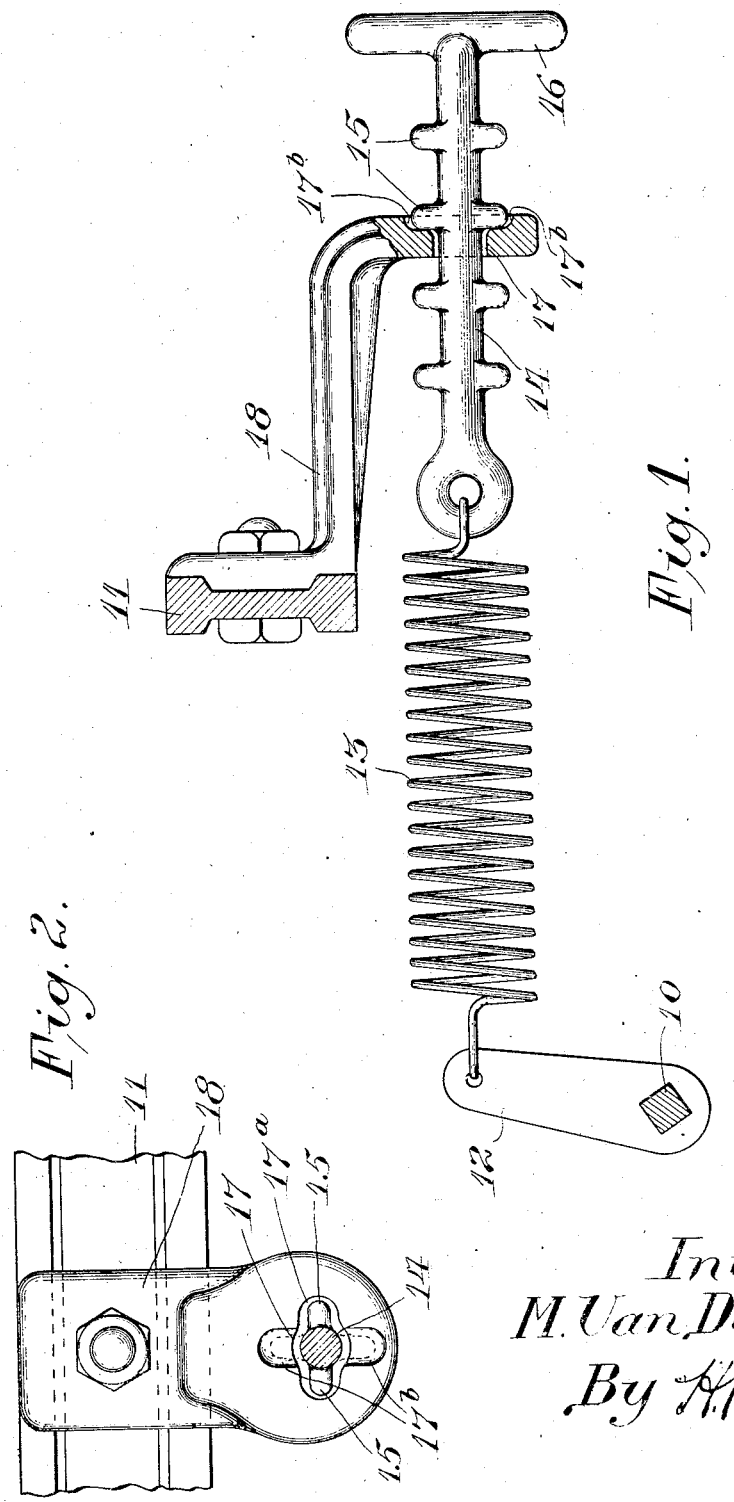

1,667,362

UNITED STATES PATENT OFFICE.

MENNO VAN DER VLIET, OF CHICAGO, ILLINOIS, ASSIGNOR TO INTERNATIONAL HARVESTER COMPANY, OF CHICAGO, ILLINOIS, A CORPORATION OF NEW JERSEY.

TENSION-ADJUSTING DEVICE.

Application filed April 20, 1923. Serial No. 633,368.

This invention relates to spring tension devices and is directed to means for regulating the tension under which a spring controlling the action of certain mechanisms is held.

The object of the invention is to provide a simple, quick, and easy device for increasing or decreasing the tension under which spring controlled parts of mechanism are held. The invention is designed more particularly for use on check row corn planters where a coil spring is ordinarily used to control the periodical rocking of the check shaft, the purpose being to substitute a cheaper and more satisfactory construction in lieu of the screw shank and nut ordinarily employed for adjusting the spring tension, as seen, for example, at 24—27 in the patent to Packham No. 1,023,221, April 16, 1912.

Accordingly, the invention resides in the combination of elements and parts, or equivalents thereof, hereinafter described and defined in the claims.

Referring to the drawings—

Fig. 1 is a side view showing the device in position; and

Fig. 2 is a plan view showing the locking bracket.

In the present instance, the invention is illustrated as combined with a rock shaft 10 and transverse frame member 11 of a corn planter and is shown as placed in horizontal position, although it is obvious that it will operate equally well in any position. The rock shaft 10 has fixed thereto an arm 12 to the end of which a coil or tension spring 13 is attached at one end. The other end of this spring has a pull rod 14 loosely connected to it in a manner to permit the rod to be turned or swiveled to some extent on its longitudinal axis. The rod 14 is provided at diametrically opposite points in its length with series of spaced lugs or projections 15 and with an operating handle 16 on its free end. The rod 14 is passed through an aperture 17 in a supporting and locking bracket 18 that is fixed in any suitable manner to the frame bar 11. The aperture 17 is formed with lateral extensions or slots 17ª which are shaped to correspond with the lugs 15 and permit them to pass through the bracket when the rod is turned to bring them into alignment therewith. At right angles to the slots 17ª and adjacent the aperture 17, the bracket 18 is provided with seats or depressions 17ᵇ corresponding in shape to the lugs 15 and adapted to receive and hold them when the rod is given a quarter turn to bring the lugs into registering position with them.

During operation of the device, it will be understood that the rock shaft 10 is, in the case of a corn planter, oscillated periodically by the check row wire and is returned to normal position by the tension of spring 13. With the device of this invention it will be evident that the tension of this spring can be quickly and easily increased or decreased by grasping the handle 16, giving the rod 14 a quarter turn and pulling or pushing the rod through the aperture 17, and then, by a reverse quarter turn, bring the lugs 15 into registry with the depressions 17ᵇ, thereby locking the rod and spring at the desired tension.

It will be seen from the above that I have provided a simple, reliable and economical device for the purpose set forth and that modifications of the particular structure described are possible within the scope of the following claims.

I claim as my invention:

1. A tension adjusting device comprising the combination with a retractile spring and a fixed bracket member provided with a slotted opening and a seat on its outer face, of a rod positioned in said opening and having one end swiveled to the spring, and a series of spaced projections along said rod adapted to pass through the opening in the bracket when the rod is turned to a certain position and to engage said seat under tension of the spring when the rod is turned to another position, the rod being locked against turning when in the last mentioned position.

2. In a check row corn planter comprising a check shaft, an arm on the shaft, and a tension spring for connecting the arm on said shaft with a fixed member on the frame of the planter; the combination with the spring and fixed member of a tension adjusting rod longitudinally movable through an opening in said fixed member and having one end loosely connected to the spring and its other end provided with a handle, a series of spaced projections formed along said rod, the opening in the fixed member being shaped to allow said projections to pass when the rod is turned to a certain position and prevent passage thereof in other positions, and seats adjacent said opening adapted to receive said projections, whereby the rod may be locked on said member, under tension of said spring at a plurality of points on its length.

3. A tension adjusting device comprising a resilient member, a fixed support provided with a socket, a rod having a series of locking means thereon, said resilient member acting to hold one of said means in the socket of said support to lock the rod against turning, the resilient member being thereby maintained at a certain tension, the rod being movable relative to the support to release one locking means and allow another to enter the socket to thereby hold the resilient member in a different state of tension.

4. A tension adjusting device comprising a spring, a fixed member, a rod connected at one end to the spring, projections on the rod normally held tightly pressed against said fixed member by the action of the spring for locking the rod to the bracket at different points in the length of the rod, the rod being locked against turning when one of the projections is pressed against the support.

5. A tension adjusting device comprising the combination with a spring and a fixed member, of a rod connected at one end to the spring, diametrically opposed teeth on the rod, and diametrically opposed sockets formed in the fixed member for locking the rod to the bracket at different points in the length of the rod.

6. A tension adjusting device comprising the combination with a spring and a fixed member, of a rod passed through an opening in the fixed member and connected at one end to the spring, and means permitting the rod to be moved longitudinally in said opening when held in one position and preventing movement therethrough when held in a second position, said spring and said means cooperating to lock the rod against turning when it is in the second position.

7. A tension adjusting device comprising the combination with a spring and a fixed member provided with an opening, of a rod positioned in said opening and having one end connected to the spring, said member providing a socket, and a series of spaced projections along said rod adapted to pass through the opening in the bracket when the rod is turned to one position, the spring holding the rod against turning by holding one of said projections in the socket when the rod is turned to another position.

8. In a check row corn planter comprising a check shaft and a tension spring for connecting an arm on said shaft with a fixed member on the frame of the planter; the combination with the spring and fixed member of an adjusting rod longitudinally movable through an opening in said fixed member and having one end connected to the spring and its other end provided with a handle, a series of diametrically opposed and spaced projections along said rod, the opening in the fixed member being shaped to allow said projections to pass when the rod is turned to one position and prevent passage thereof when the rod is turned to a second position, whereby the rod may be locked on said member at any one of a plurality of points on its length.

In testimony whereof I affix my signature.

MENNO VAN DER VLIET.